S. S. SARGEANT.
Trace Carrier.

No. 201,452. Patented March 19, 1878.

WITNESSES
E. M. Gallaher
John L. Toudrou

INVENTOR
Samuel S. Sargeant,
By J. A. Brown,
his ATTORNEY.

UNITED STATES PATENT OFFICE.

SAMUEL S. SARGEANT, OF NEWARK, NEW JERSEY.

IMPROVEMENT IN TRACE-CARRIERS.

Specification forming part of Letters Patent No. 201,452, dated March 19, 1878; application filed July 7, 1877.

*To all whom it may concern:*

Be it known that I, SAMUEL S. SARGEANT, of Newark, in the county of Essex and State of New Jersey, have invented an Improved Trace-Carrier; and I do hereby declare that the following is a full and exact description thereof, reference being had to the accompanying drawings, making part of this specification—

Figure 1:
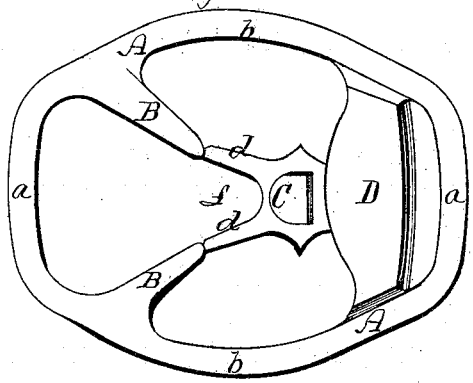
Figure 2:
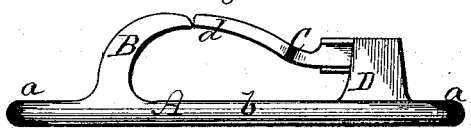
Figure 3:
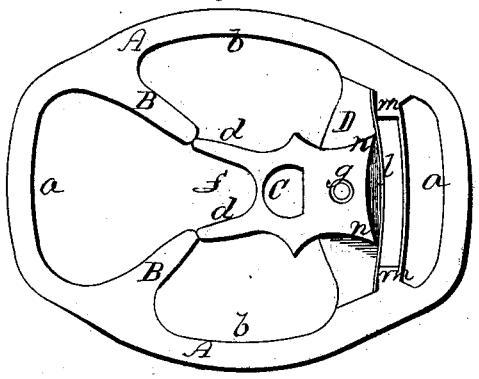
Figure 4:
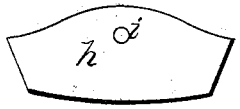

Figure 1 being a top view of the improved trace-carrier; Fig. 2, a side view of the same; Fig. 3, a bottom view thereof, a part being removed to show interior construction; Fig. 4, a view of the part removed, as shown in Fig. 3, shown separate.

Like letters designate corresponding parts in all of the figures.

A bow or frame, A, is provided, of proper construction for mounting on a suitable part of a harness, the construction shown being intended for attachment to the crupper-strap, dividing the same where the side straps which sustain the holdback of the harness are connected therewith, the loops $a\ a$ being provided to receive the parts of the crupper-strap, and the side loops $b\ b$ to receive the side straps referred to. From the frame A extend upward and inward two hooks or curved projections, B B, upon which the traces are hung when detached from the vehicle.

To provide a secure and convenient means of retaining the traces upon these hooks without materially interfering with the attachment or detachment of the traces is the special object of this invention. For this purpose I mount a swinging guard, C, in a raised cross-bar or bearing, D, which is formed on or secured to the frame A. This guard has two prongs, $d\ d$, that, when in a central position, respectively, remain opposite to the two points or ends of the carrier-hooks B B, substantially as represented, there being a hollowed space, $f$, between the prongs, into which the fingers or ends of the traces may enter to push one of the prongs aside in an outward direction. The guard is held securely in its bearings, so that it will not move vertically, but will move laterally in a nearly-horizontal plane on its pivot $g$, Fig. 3. This pivot, for convenience of construction, is cast with, and projects downward from, the cross-bar D, which is formed to box in and house the pivot-joint on all sides, except the inner side and bottom; and when the guard is mounted on the pivot, a bottom plate, $h$, Fig. 4, fits into the cross-bar, covering the joint, and is secured in place by means of a hole, $i$, therein, which goes over the pivot $g$, that is then riveted against the lower side of the plate and holds all in place.

To keep the guard in a central position opposite to the carrier-hooks B B, a spring, $l$, Fig. 3, is located behind it, the ends thereof resting against bearings $m\ m$ of the cross-bar, while projections $n\ n$ on the guard strike the spring and bend it, if moved laterally in one or the other direction, and are caused, by the force of the spring, to return the guard to a central position when left free.

Any equivalent mode of applying the spring to effect the purpose may be adopted.

Thus, it will be seen that, while the guard effectually prevents the accidental detachment of the traces from the hooks, they are easily attached or removed, by simply pushing aside the guard laterally in either direction, either outside or inside of the carrier-hooks.

I disclaim snap-hooks, single and double, as applied to trace-carriers, my improved guard acting on an entirely different principle.

What I claim as my invention, and desire to secure by Letters Patent, is—

1. The double-pronged guard C, pivoted as described, in combination with the carrier-hooks B B, and adapted to swing laterally by the said hooks in both directions, substantially as and for the purpose herein specified.

2. The pivot cross-bar D and bottom plate $h$, constructed substantially as described, in combination with the guard C, substantially as and for the purpose herein specified.

S. S. SARGEANT.

Witnesses:
E. D. FARNSWORTH,
H. L. JOHNSTON.